P. S. OLT.
ARTIFICIAL BAIT.
APPLICATION FILED NOV. 1, 1915.
1,292,865.
Patented Jan. 28, 1919.
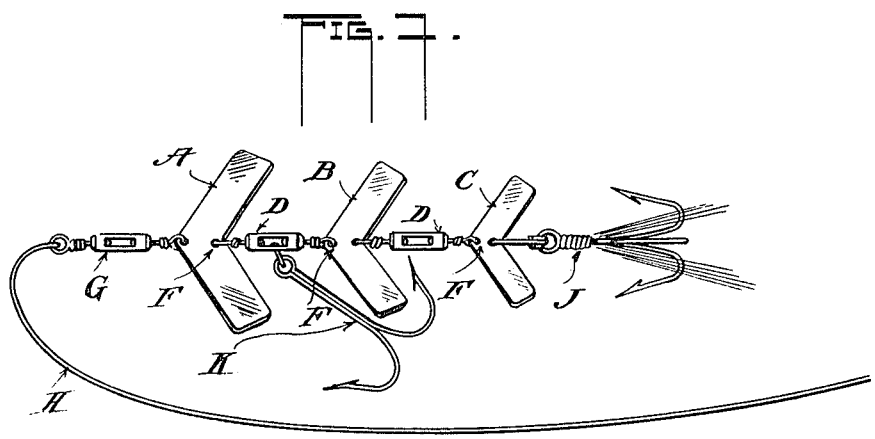
Witnesses:
Marie Dacey
Louise Masch
Inventor:
Philip S. Ott,
By L. M. Hurlow
Atty.

UNITED STATES PATENT OFFICE.

PHILIP S. OLT, OF PEKIN, ILLINOIS.

ARTIFICIAL BAIT.

1,292,865.　　　　　Specification of Letters Patent.　　Patented Jan. 28, 1919.

Application filed November 1, 1915. Serial No. 59,109.

*To all whom it may concern:*

Be it known that I, PHILIP S. OLT, citizen of the United States, residing at Pekin, in the county of Tazewell and State of Illinois, have invented certain new and useful Improvements in Artificial Bait; and I do hereby declare that the following is a full, clear, and exact description of the invention, which will enable others skilled in the art to which it appertains to make and use the same.

This invention relates to improvements in artificial bait of that class wherein a plurality of rotatable members in their passage through the water are made to rotate.

The primary object of the invention is to employ a plurality of rotatable members or elements, preferably of polished metal, loosely connected one behind the other whereby all will rotate independently of one another.

Another object is to connect together a series of rotatable elements, said elements being connected to one another after the manner of the links of a chain whereby each will be free to rotate in the water independent of the others and also have movement laterally as a part of a chain.

Still another object is to link together a plurality of members capable of rotation and made to rotate by their passage through the water and to make the size of each member smaller than that immediately preceding it in order to provide a certain appearance and action in use.

Another object is to construct an artificial bait, which includes a series of rotatable elements, in such a way that it will simulate the movements of a fish in its travel through the water.

In the appended drawing Figure 1 illustrates my improved bait in its complete form; and Fig. 2 shows one of the members of the bait as seen edgewise from the rear.

A, B, C represent three rotatable members or spinners spaced from one another and connected loosely to one another by means of swivels D D the extremities of which extend through suitable apertures F in the several described spinners.

G is a swivel connected to the forward spinner A, the line H being attached to it, while to the rearmost spinner C is connected any usual hook gang J.

Attached to one of the swivels between the series of spinners A B C, preferably that between A and B is a hook K. It is observed that the several described spinners are of different size. That is to say, the forward spinner A is the largest of the series, B being somewhat smaller, C being still smaller so that in rotating the appearance of a round object tapering toward its rear end will be the illusion.

It is also observed that, as brought out in the object above, the several spinners are linked together, the linkage consisting of suitable forms of swivels so that each spinner will be free to rotate relative to the others.

In action the spinners may be made to rotate at different speeds by changing the pitch of their blades so that certain of them can be made to rotate faster than others to produce a more conspicuous bait and which will cause a wiggling action thereof.

The hook K is placed between the spinners so that it will not rotate but will be in position to catch the fish no matter from which direction it may strike because said hook will drag, whereas, if said hook rotated with the bait it would be held outward by centrifugal force exerted upon it and would not maintain such a position that its barbs would positively impale the fish.

Since the hook drags its points will extend in the direction of travel of the bait and always be in position to be most effective as the fish strikes at the forward part or advance end of said bait.

These members when nickel-plated, for instance, or if highly colored in order to attract the fish, in rotating at high speed by being drawn through the water will present the illusion of a rounded body tapered toward its rear end by reason of the different sizes of the spinners and quite closely simulating the form of a fish, the attraction being by reason of the bright surfaces flashing or reflecting the light.

The spinners in being loosely connected by the described linkage, and due to the several different speeds of rotation cause the bait to partake of a wiggling motion much after the manner of a fish which in swimming propels itself by a sidewise movement of its tail. The purpose of this movement is to closely imitate the fish as a greater attraction to the quarry.

The several spinners are somewhat in the form of an L and present a warped surface,—that is,—the arms are bent so as to lie in two different planes so that in passing through the water they will be spun after the manner of a propeller.

As the fish often strikes from the side the hook K is placed in the most advantageous position directly behind the foremost spinner A, while if the fish strikes from the rear the gang hook J is in position to be effective.

It is particularly to be observed that the rearmost spinner C is of substantially the same measurement from point to point as the measurement between the points of the gang-hook J. In devices of this nature of which I am aware the measurement across the spinners is greatly in excess of the hook so that as that in the rapid rotation of the spinner the fish when striking from the side is prevented reaching the hook but is struck by the spinner and prevented getting near enough to be caught by the hook.

Again, if the fish approaches the bait from the rear in an attempt to swallow it a spinner considerably larger than the hook interferes and the fish cannot close upon said hook.

In my device, however, since the hook and spinner are substantially the same size the chances of losing the fish are reduced to such an extent as to make said device very successful in practice.

My artificial bait is not likely to be easily caught in weeds and brush since the rotation of the spinners tends to keep the hooks cleared and is found in practice to give little or no trouble in this respect.

I am not aware of a bait made up of a series of spinners connected by a loose linkage after the manner described and shown wherein said spinners are nicely balanced by attaching the swivels at the middle thereof so that during their rotation the bait will move in a straight line behind the line when drawn through the water.

I do not wish to be confined to the particular form and arrangement described and shown since I may make various changes and variations in the structure such as will lie within the invention and the meaning of the appended claims.

Having thus described my invention, I claim:—

1. An artificial bait comprising a series of spinners, and swivels hingedly connecting said spinners with each other whereby all of the swivels and said spinners are free to have lateral movement relatively to each other, the point of attachment of the swivels to the spinners being at the middles of the latter whereby in action the halves of each spinner balance one another, the diameters of the spinners measured between their extremities successively decreasing from the forward end of the bait to its rear end, and a hook connected with the rearmost spinner, the measurement between the points of the hooks at the greatest measurement across the extremities of said rearmost spinner being substantially the same.

2. An artificial bait comprising a series of spinners, a swivel linking each to the other in a continuous line, the diameters of the spinners measured between their extremities successively decreasing from the forward end to the rear end of the bait, a gang-hook at the rear of the bait attached to the rearmost spinner, the greatest diameter of the same between the points of its hooks being substantially the same as the diameter of the said rearmost spinner, and a hook attached to one of the swivels and extending outward from between two adjacent spinners.

In testimony whereof I affix my signature, in presence of two witnesses.

PHILIP S. OLT.

Witnesses:
F. W. BEYER,
T. W. MOTT.